United States Patent
Tamma et al.

(10) Patent No.: US 7,296,555 B2
(45) Date of Patent: Nov. 20, 2007

(54) SYSTEM AND METHOD FOR OPERATING A TURBO-CHARGED ENGINE

(75) Inventors: Bhaskar Tamma, Bangalore (IN); Michael Kent Cueman, Niskayuna, NY (US); Roy James Primus, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/211,981

(22) Filed: Aug. 25, 2005

(65) Prior Publication Data

US 2007/0044752 A1    Mar. 1, 2007

(51) Int. Cl.
*F02B 3/00*   (2006.01)
*F02M 43/00*  (2006.01)

(52) U.S. Cl. .................. 123/304; 123/299; 701/104
(58) Field of Classification Search ........... 123/299, 123/300, 304, 305; 701/103–105
See application file for complete search history.

(56) References Cited

U.S. PATENT DOCUMENTS

| | | | |
|---|---|---|---|
| 5,740,775 A |  | 4/1998 | Suzuki et al. ............. 123/299 |
| 5,979,398 A | * | 11/1999 | Yanagihara .............. 123/299 |
| 6,182,632 B1 | * | 2/2001 | Yanagihara .............. 123/299 |
| 6,302,080 B1 | | 10/2001 | Kato et al. ................ 123/295 |
| 6,354,269 B1 | | 3/2002 | Saito et al. ............... 123/436 |
| 6,378,487 B1 | * | 4/2002 | Zukouski et al. ......... 123/299 |
| 6,382,177 B1 | | 5/2002 | Saito ........................ 123/299 |
| 6,401,688 B2 | * | 6/2002 | Teraji et al. ............... 123/295 |
| 6,470,849 B1 | | 10/2002 | Duffy et al. .............. 123/299 |
| 6,484,689 B1 | * | 11/2002 | Hasegawa ................. 123/299 |
| 6,640,773 B2 | * | 11/2003 | Ancimer et al. ........... 123/299 |
| 6,826,470 B2 | * | 11/2004 | Nakano et al. ............ 701/103 |
| 6,845,747 B2 | * | 1/2005 | Rasmussen et al. ....... 123/299 |
| 6,863,058 B2 | * | 3/2005 | Kurtz et al. ............... 123/672 |
| 6,901,906 B2 | * | 6/2005 | Goto et al. ................ 123/299 |
| 6,990,801 B2 | * | 1/2006 | Kitahara ...................... 60/285 |
| 6,994,072 B2 | * | 2/2006 | Kuo et al. ................. 123/295 |
| 7,007,462 B2 | * | 3/2006 | Kitahara ...................... 60/285 |
| 7,021,276 B2 | * | 4/2006 | Liu et al. ................... 123/299 |
| 7,051,701 B2 | * | 5/2006 | Tomita ....................... 123/299 |
| 7,054,734 B2 | * | 5/2006 | Todoroki et al. .......... 701/105 |
| 7,055,493 B2 | * | 6/2006 | Bertilsson .................. 123/299 |
| 7,096,853 B2 | * | 8/2006 | Tomita .................. 123/406.47 |
| 2004/0103875 A1 | * | 6/2004 | Simon et al. .............. 123/300 |
| 2004/0154582 A1 | * | 8/2004 | Shimazaki ................. 123/299 |
| 2005/0022506 A1 | * | 2/2005 | Nishizawa et al. .......... 60/276 |
| 2005/0039444 A1 | * | 2/2005 | Nishizawa et al. .......... 60/285 |
| 2005/0161021 A1 | * | 7/2005 | Ishii et al. ................. 123/305 |
| 2006/0180121 A1 | * | 8/2006 | Wickman et al. .......... 123/299 |

FOREIGN PATENT DOCUMENTS

| | | | |
|---|---|---|---|
| DE | 102004052415 A1 | | 7/2005 |
| EP | 1077321 | * | 2/2001 |
| EP | 1707785 A | | 10/2006 |

* cited by examiner

*Primary Examiner*—Hai Huynh
(74) *Attorney, Agent, or Firm*—Fletcher Yoder

(57) ABSTRACT

In certain embodiments, there is provided a method of operating a turbocharged system including injecting a first quantity of fuel into an engine cylinder at a first predetermined time during a second half of a compression stroke before a piston of the engine cylinder reaches top dead center of the compression stroke. The method further includes injecting a second quantity of fuel into the engine cylinder at a second predetermined time after the first predetermined time when the piston is advanced by a predetermined advance value before the piston reaches the top dead center of the compression stroke.

35 Claims, 7 Drawing Sheets

SYSTEM AND METHOD FOR OPERATING A TURBO-CHARGED ENGINE

BACKGROUND

The invention relates generally to a system and method for operating a turbo-charged compression-ignition engine and, more specifically, to a system and method for reducing specific fuel consumption and engine exhaust emission in a turbo-charged diesel engine in a locomotive.

In a compression-ignition engine, such as a diesel engine, a fuel injection system injects fuel (e.g. diesel fuel) into compressed air within each of the engine cylinders to create an air-fuel mixture that ignites due to the heat and pressure of compression. Unfortunately, engine efficiency, power output, fuel consumption, exhaust emissions, and other operational characteristics are less than ideal. In addition, conventional techniques to improve one operational characteristic often worsen one or more other operational characteristic. For example, attempts to decrease specific fuel consumption often cause increases in various exhaust emissions. Vehicle exhaust emissions include pollutants such as carbon monoxide, nitrogen oxides (NOx), particulate matter (PM), and smoke generated due to incomplete combustion of fuel within the combustion chamber. The amount of these pollutants varies depending on the fuel-air mixture, compression ratio, injection timing, ambient conditions, and so forth.

Therefore, a technique is needed for reducing specific fuel consumption without increasing certain exhaust emissions, such as NOx, in a turbo-charged diesel engine.

BRIEF DESCRIPTION

In accordance with one aspect of the present technique, a method includes injecting a first quantity of fuel into an engine cylinder at a first predetermined time during a second half of a compression stroke before a piston of the engine cylinder reaches top dead center of the compression stroke. The method further includes injecting a second quantity of fuel into the engine cylinder at a second predetermined time after the first predetermined time when the piston is advanced by a predetermined advance value before the piston reaches the top dead center of the compression stroke.

In accordance with another aspect of the present technique, a method includes advancing fuel injection by a predetermined advance value to reduce specific fuel consumption in a compression-ignition engine of a locomotive. The method further includes splitting the fuel injection of a predetermined quantity of fuel into a pilot fuel quantity and a majority fuel quantity during a second half of a compression stroke and before top dead center of the compression stroke of the compression-ignition engine to reduce nitrogen oxide emissions associated with advancing the fuel injection.

In accordance with another aspect of the present technique, a system includes a controller configured to inject a first quantity of fuel into an engine cylinder at a first predetermined time during a second half of a compression stroke before a piston of the engine cylinder reaches top dead center of the compression stroke and configured to inject a second quantity of fuel into the engine cylinder at a second predetermined time after the first predetermined time when the piston is advanced by a predetermined advance value before the piston reaches the top dead center of the compression stroke.

In accordance with another aspect of the present technique, a locomotive includes a turbocharger, a compression-ignition engine, and a controller coupled to the compression-ignition engine and configured to inject a first quantity of fuel into an engine cylinder at a first predetermined time during a second half of a compression stroke before a piston of the engine cylinder reaches top dead center of the compression stroke, and configured to inject a second quantity of fuel into the engine cylinder at a second predetermined time after the first predetermined time when the piston is advanced by a predetermined advance value before the piston reaches the top dead center of the compression stroke.

In accordance with another of the present technique, a method includes providing a controller configured to inject a first quantity of fuel into an engine cylinder at a first predetermined time during a second half of a compression stroke before a piston of the engine cylinder reaches top dead center of the compression stroke and configured to inject a second quantity of fuel into the engine cylinder at a second predetermined time after the first predetermined time when the piston is advanced by a predetermined advance value before the piston reaches the top dead center of the compression stroke.

In accordance with another aspect of the present technique, a computer program includes a tangible medium and programming instructions disposed on the tangible medium, wherein the programming instructions include instructions to inject a first quantity of fuel into an engine cylinder at a first predetermined time during a second half of a compression stroke before a piston of the engine cylinder reaches top dead center of the compression stroke, and instructions to inject a second quantity of fuel into the engine cylinder at a second predetermined time after the first predetermined time when the piston is advanced by a predetermined advance value before the piston reaches the top dead center of the compression stroke.

DRAWINGS

These and other features, aspects, and advantages of the present invention will become better understood when the following detailed description is read with reference to the accompanying drawings in which like characters represent like parts throughout the drawings, wherein.

Figure 8:
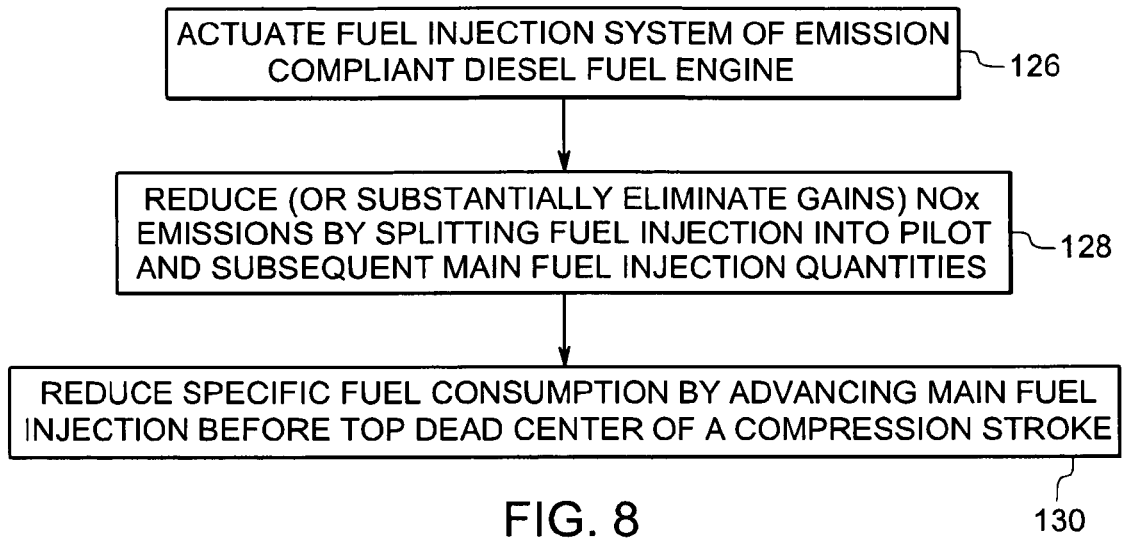
Figure 9:
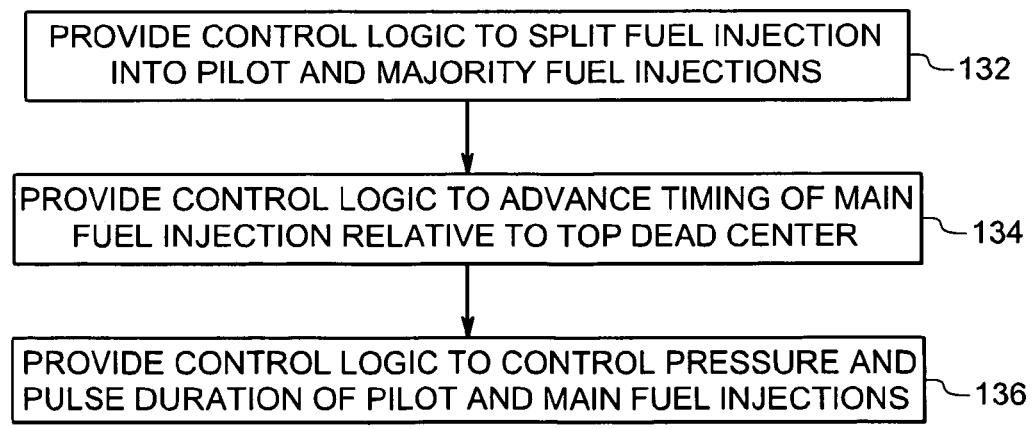

FIG. 8 is a flow chart illustrating a process of controlling engine exhaust emission and specific fuel consumption within a turbocharged engine in accordance with an exemplary embodiment of the present technique; and FIG. 9 is a flow chart illustrating an exemplary process of manufacturing a turbocharged engine, such as a locomotive power unit, having engine exhaust emission and specific fuel consumption control features in accordance with an exemplary embodiment of the present technique.

DETAILED DESCRIPTION

Figure 1:
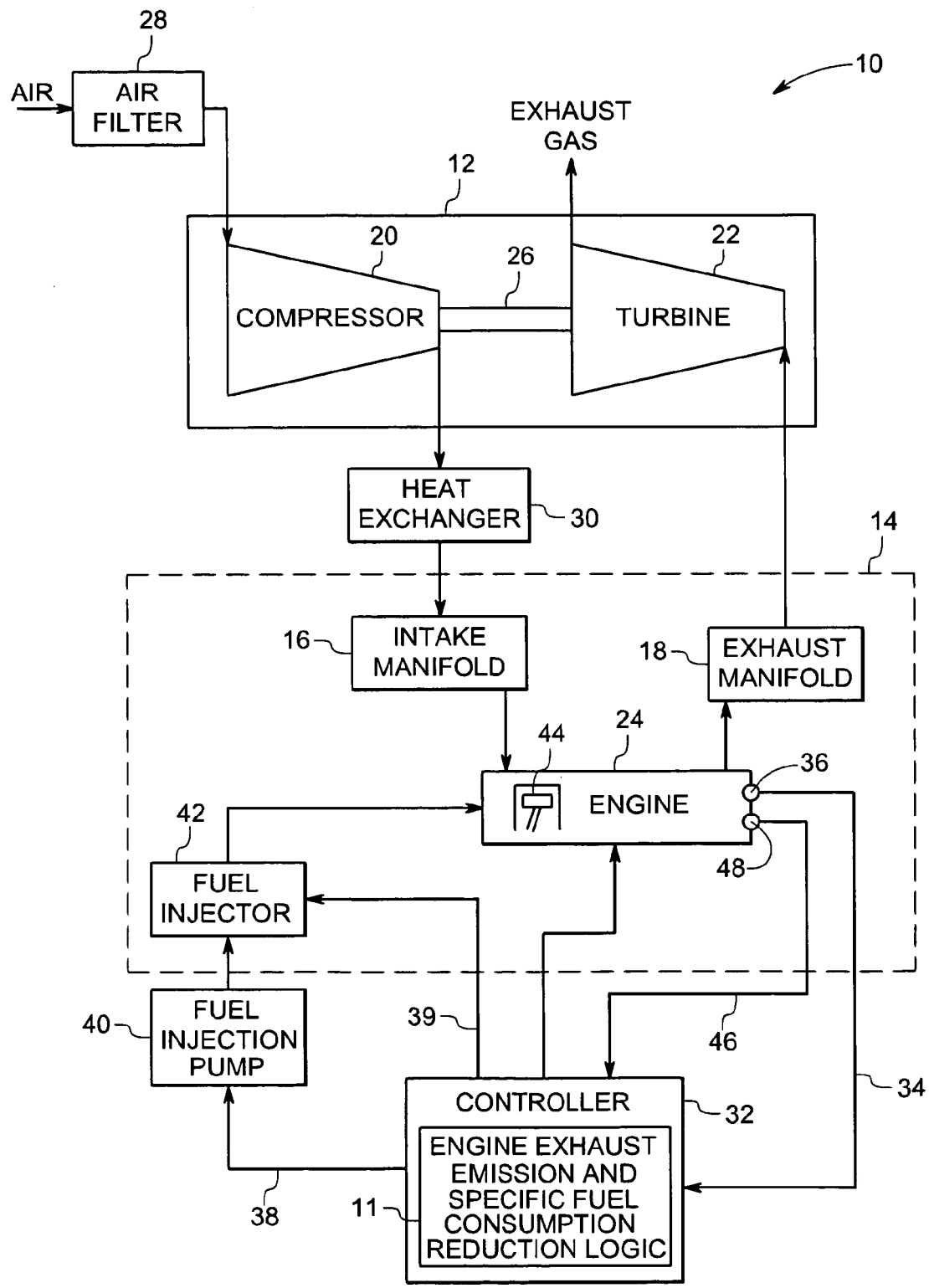
FIG. 1 is a diagrammatical representation of a turbo-charged engine, such as a locomotive power unit, having engine exhaust emission and specific fuel consumption control features in accordance with an exemplary embodiment of the present technique.

Referring to FIG. 1, a turbocharged system 10 having engine exhaust emission and specific fuel consumption reduction logic 11 is illustrated in accordance with certain embodiments of the present technique. In the illustrated embodiment, the turbocharged system 10 is a locomotive power unit. In other embodiments, the power unit may be used for other medium speed engine applications as known to those skilled in the art. The locomotive power unit 10 includes a turbocharger 12 and a compression-ignition engine, e.g. diesel engine 14. As discussed in further detail below, embodiments of the present technique provide monitoring and control features, such as sensors and control logic, to control engine exhaust emissions and specific fuel consumption (SFC) within the locomotive power unit 10. For example, the engine exhaust emissions are controlled and the specific fuel consumption is reduced by splitting fuel injection of a predetermined quantity into a pilot fuel injection and an advanced main fuel injection during a second half of a compression stroke and before top dead center position of the compression stroke of the engine 14 based on operating conditions of the engine 14 such as engine speed, crank angle, common rail pressure, or the like. In accordance with the embodiments of the present technique, second half of the compression stroke relates to a crank angle of 90 degrees before top dead center of the compression stroke. The injection operation includes splitting the fuel injection into the pilot fuel injection and the main fuel injection, providing larger fuel quantity in the main injection event, advancing the main injection event by a predetermined value, and adjusting timing between the pilot injection and the main injection.

The illustrated engine 14 includes an air intake manifold 16 and an exhaust manifold 18. The turbocharger 12 includes a compressor 20 and a turbine 22 and is operated to supply compressed air to the intake manifold 16 for combustion within a cylinder 24. The turbine 22 is coupled to the exhaust manifold 18. The exhaust gases ejected from the exhaust manifold 18 are expanded through the turbine 22, thereby forcing rotation of a turbocharger shaft 26 connected to the compressor 20. The compressor 20 draws in ambient air through an air filter 28 and provides compressed air to a heat exchanger 30. The temperature of air is increased due to compression through the compressor 20. The compressed air flows through the heat exchanger 30 such that the temperature of air is reduced prior to delivery into the intake manifold 16 of the engine 14. In one embodiment, the heat exchanger 30 is an air-to-water heat exchanger, which utilizes a coolant to facilitate removal of heat from the compressed air. In another embodiment, the heat exchanger 30 is an air-to-air heat exchanger, which utilizes ambient air to facilitate removal of heat from compressed air. In yet another embodiment, the heat exchanger 30 utilizes a combination of a coolant and ambient air to facilitate removal of heat from compressed air.

The power unit 10 also includes a controller 32. In one embodiment, the controller 32 is an electronic logic controller that is programmable by a user. In another embodiment, the controller 32 is an electronic fuel injection controller for the engine 14. The controller 32 receives a crank angle signal 34 from a crank angle sensor 36 provided to detect crank angle (in degrees) of a crank shaft (not shown) of the engine 14. The controller 32 may be operable to produce a pressure signal 38 to control operation of a plurality of fuel injection pumps 40. The pumps 40 drive a plurality of fuel injectors 42 for injecting fuel into the plurality of cylinders 24 of the engine 14. In the illustrated embodiment, the fuel injector 42 is an electrically actuated fuel injector. The fuel injector 42 typically injects fuel into the engine cylinder 24 as a function of a fuel injection signal 39 received from the controller 32. The fuel injection signal 39 may include waveforms that are indicative of a desired injection rate, desired fuel injection timing, quantity of fuel to be injected into the cylinder 24, or the like. A piston 44 is slidably disposed in each cylinder 24 and reciprocates between a top dead center and a bottom dead center position as known to those skilled in the art. The controller 32 also receives a speed signal 46 from a speed sensor 48 configured to detect speed (in revolutions per minute of the crank shaft) of the engine 14. The controller 32 is configured to produce the fuel injection signal 39 to control the operation of plurality of fuel injectors 42 based on the crank angle signal 34 and the engine speed signal 46.

Figure 2:
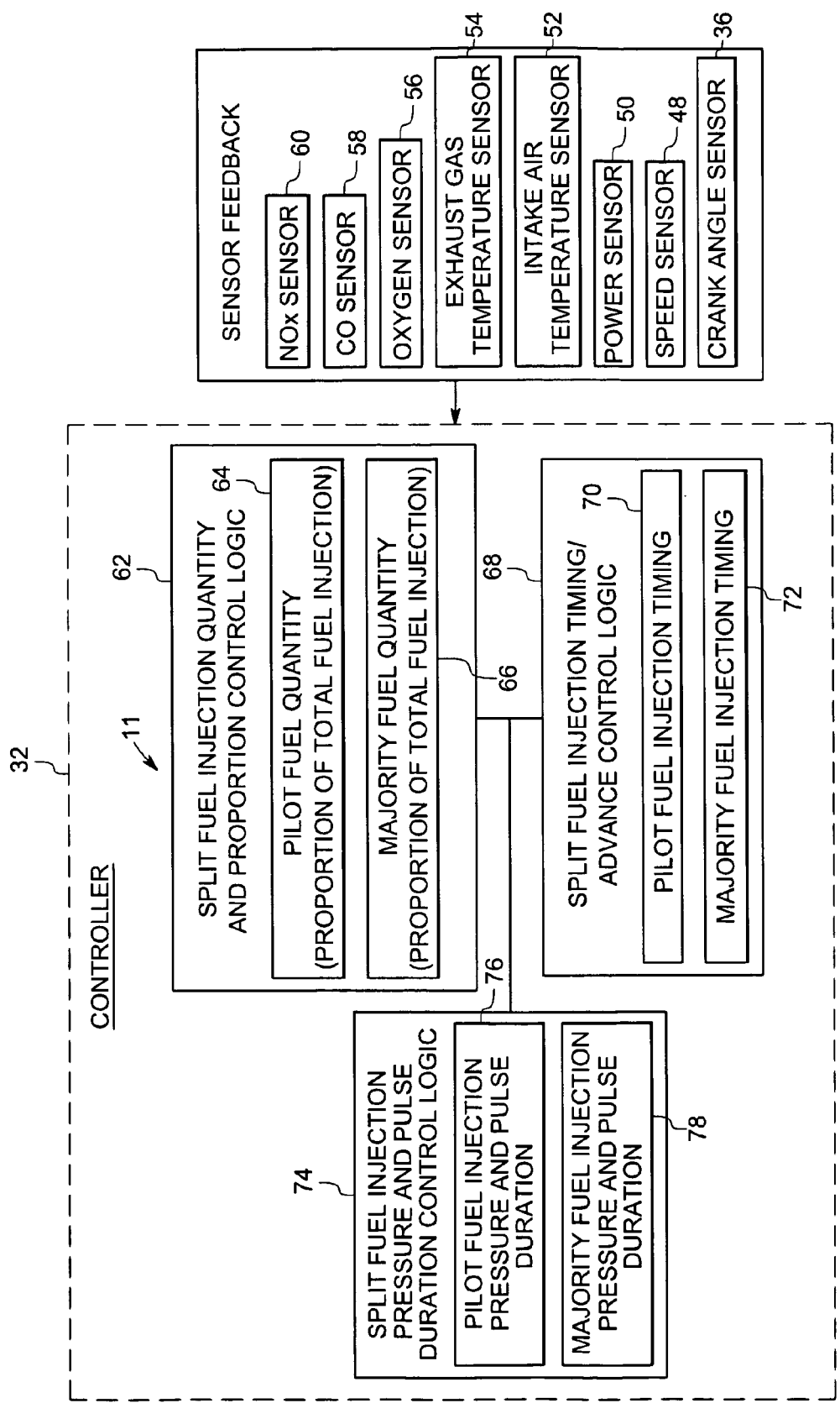
FIG. 2 is a diagrammatical representation of engine exhaust emission and specific fuel consumption control logic features in accordance with an exemplary embodiment of the present technique.

Referring to FIG. 2, the controller 32 having engine exhaust emission and specific fuel consumption control logic 11 is illustrated in accordance with embodiments of the present technique. As illustrated, the controller 32 receives sensor signals from a of plurality of sensors, such as the crank angle sensor 36, the speed sensor 48, a power sensor 50, an intake air temperature sensor 52, an exhaust gas temperature sensor 54, an oxygen sensor 56, a CO sensor 58, and a NOx sensor 60. The power sensor 50 may be configured to detect engine power (in horse power). The intake air temperature sensor 52 may be configured to detect temperature of air (in degrees or kelvin) fed to the intake manifold. The exhaust gas temperature sensor 54 may be configured to detect the temperature of exhaust gas (in degrees or kelvin) ejected from the exhaust manifold. The oxygen sensor 56, the CO sensor 58, and the NOx sensor 60 may be configured to detect quantity of oxygen, carbon monoxide, and oxides of nitrogen respectively in the exhaust gas. The controller 32 includes a split fuel injection quantity and proportion control logic 62 that enables the controller 32 to inject a first quantity of fuel (e.g., pilot fuel injection) 64 into the engine cylinder 24 before the piston reaches top dead center position of the compression stroke. For example, pilot fuel injection quantity in the range of 1 to 5% of total fuel injection quantity may be injected into the engine cylinder before the top dead center of the compression stroke. The split fuel injection quantity and proportion control logic 62 also enables the controller 32 to inject a second quantity of fuel (e.g., majority/main fuel injection) 66 into the engine cylinder when the piston is in the vicinity of the top dead center position of the compression stroke. For example, main fuel injection quantity in the range of 95 to 99% of the total fuel injection quantity may be injected into the engine cylinder 24 when the piston position is in vicinity of the top dead center of the compression stroke.

The controller 32 also includes a split fuel injection timing/advance control logic 68 that enables the controller 32 to inject the pilot fuel injection quantity into the engine cylinder at a first predetermined time 70 before the piston reaches top dead center position of the compression stroke. For example, pilot fuel injection is performed when the piston position is in the range of 20 to 90 degrees before the top dead center of the compression stroke. The split fuel injection timing/advance control logic 68 also enables the controller 32 to inject the main fuel injection quantity into the engine cylinder at a second predetermined time 72 before the piston reaches top dead center position of the compression stroke. For example, main fuel injection may be performed when the piston position is in the range of less than 5 degrees before the top dead center of the compression stroke.

In the illustrated embodiment, the controller 32 further includes a split fuel injection pressure and pulse duration control logic 74 that enables the controller 32 to control the pressure and pulse duration of the pilot fuel injection 76. The split fuel injection pressure and pulse duration control logic 74 also enables the controller 32 to control the pressure and pulse duration of the main fuel injection 78. As discussed above in the illustrated embodiment, the controller 32 is configured to control the fuel injection quantity, timing, pressure and pulse duration based on the output from the plurality of sensors. Although in the illustrated embodiment, the controller operation is explained in relation to one engine cylinder 24, in other embodiments the controller operation is applicable to multiple engine cylinders 24.

Figure 3:
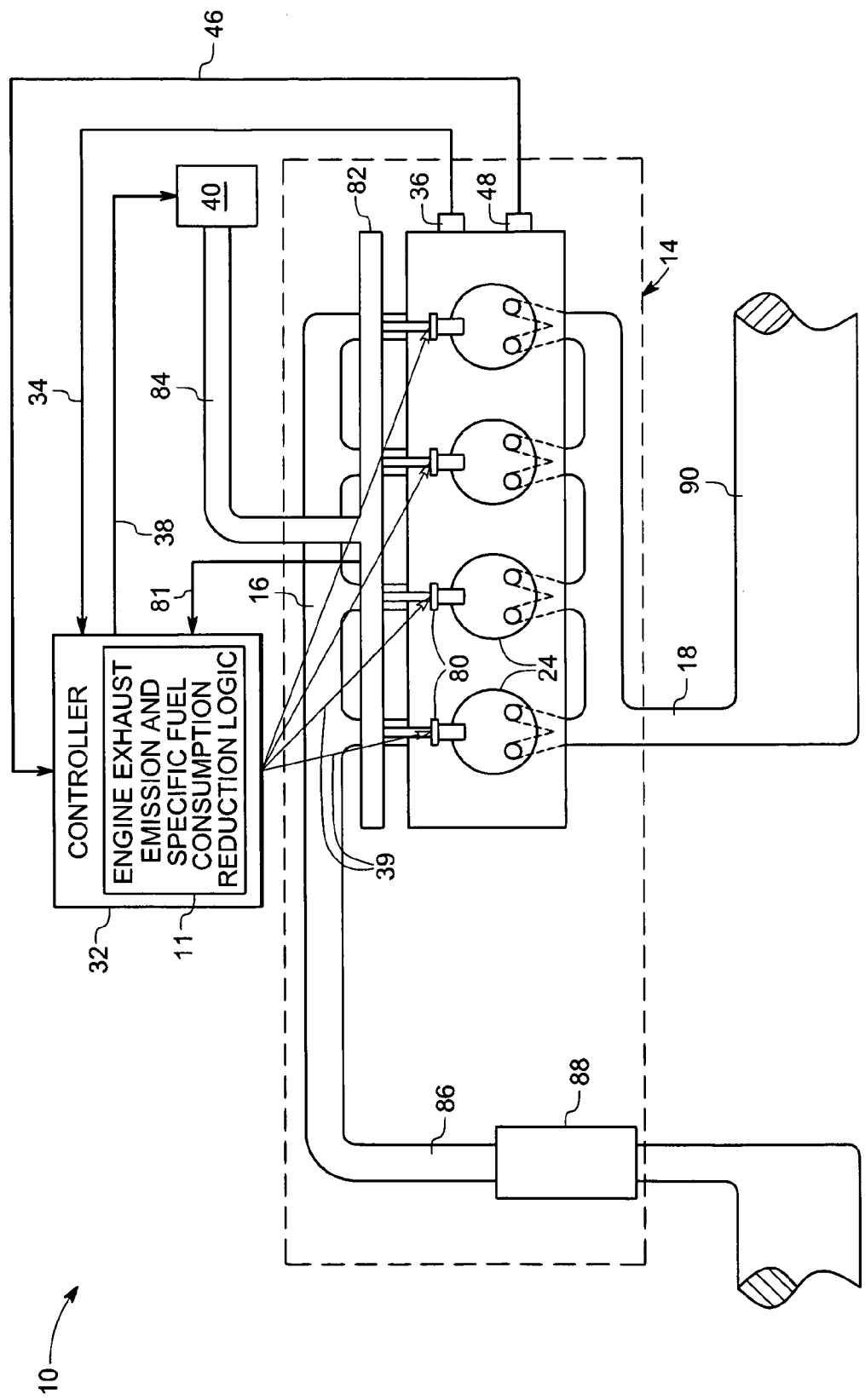
FIG. 3 is a diagrammatical representation of a multi-cylinder internal combustion engine having engine exhaust emission and specific fuel consumption control features in accordance with an exemplary embodiment of the present technique.

Referring to FIG. 3, the locomotive power unit 10 having a multi-cylinder arrangement of the engine 14 is illustrated in accordance with certain embodiments of the present technique. The fuel injectors each include a fuel injection valve 80 disposed in fluid communication with a respective cylinder 24. In the illustrated embodiment, the engine 14 includes four cylinders 24 and four fuel injection valves 80, respectively. However, other numbers (e.g., 6, 8, 10, 12, etc.) and configurations of cylinders 24 and fuel injection valves 80 are within the scope of the present technique. The fuel injection valves 80 are provided to inject fuel into a combustion chamber of each cylinder 24. The fuel injection valves 80 are coupled to a high pressure common rail 82 configured to pressurize the fuel to a preselected pressure. The high pressure common rail 82 is coupled to the fuel injection pump 40 via a fuel supply pipe 84. The common rail 82 may be provided with a pressure sensor (not shown) for detecting a fuel pressure in the common rail 82 and transmitting a pressure signal 81 corresponding to the detected fuel pressure to the controller 32. The fuel pressure in the common rail is maintained at a predetermined value depending on the operating condition of the engine 14 by actuating the fuel injection pump 40. In certain embodiments, the controller 32 is configured to produce the fuel injection signal 39 to control the operation of plurality of fuel injectors based on the crank angle signal 34, engine speed signal 46. In other embodiments, the power unit may have a plurality of common rails 82 and fuel injection pumps 40. In one example, the locomotive engine 14 may include the following specifications such as maximum in-cylinder pressure in the range of 80 to 240 bars; four stroke; stepped operation i.e. notches for a throttle valve; medium speed in the range of 300 to 1500 revolutions per minute; displacement in the range of 5 to 20 liters per cylinder; and the common rail fuel injection system.

The intake manifold 16 is coupled to the combustion chambers of the respective cylinders 24. The intake manifold 16 is coupled to an intake pipe 86. The intake air temperature sensor (not shown) may be provided to the intake pipe 86. A heat exchanger 88 may be provided in the intake pipe 86 to cool the intake air through the intake pipe 86. The exhaust manifold 18 is coupled to the combustion chambers of respective cylinders 24. The exhaust manifold 18 is coupled to an exhaust pipe 90. The plurality of sensors (not shown) such as the exhaust gas temperature sensor, the oxygen sensor, the CO sensor, and the NOx sensor may be coupled to the exhaust pipe 90.

As discussed above, the controller 32 receives the crank angle signal 34 from the crank angle sensor 36 provided to detect crank angle of the engine 14. The controller 32 may be operable to produce the fuel injection signal 39 to control operation of the fuel injectors. The controller 32 also receives the speed signal 46 from the speed sensor 48 configured to detect speed of the engine 14. As discussed above, in the illustrated embodiment, the controller 32 is configured to control the fuel injection quantity, timing, pressure and pulse duration based on the output from the plurality of sensors. The usage of high pressure common rail 82 along with electrically actuated fuel injector enables the controller 32 to provide flexibility in fuel injection rate, number of fuel injections, the fuel injection quantity, timing, pressure, and pulse duration. In accordance with the embodiments of the present technique, the fuel injection operation is applicable from medium load to full load conditions of the engine.

For a single shot fuel injection, if the fuel injection timing is advanced, the specific fuel consumption is reduced and the exhaust gas emission is increased. In accordance with the present technique, the fuel injection is split into the pilot fuel injection and the main fuel injection with advanced timing before top dead center position of the compression stroke of the engine 14. Atomization of fuel is enhanced due to split injection and may be further promoted by increasing the injection pressure of the fuel. The fuel is uniformly distributed in the combustion chamber and the air utilization within the combustion chamber is enhanced. Smaller quantity of pilot injection facilitates prevention of adherence of fuel to cylinder walls. As a result, the exhaust gas emission is substantially controlled and the specific fuel consumption is reduced.

Figure 4:
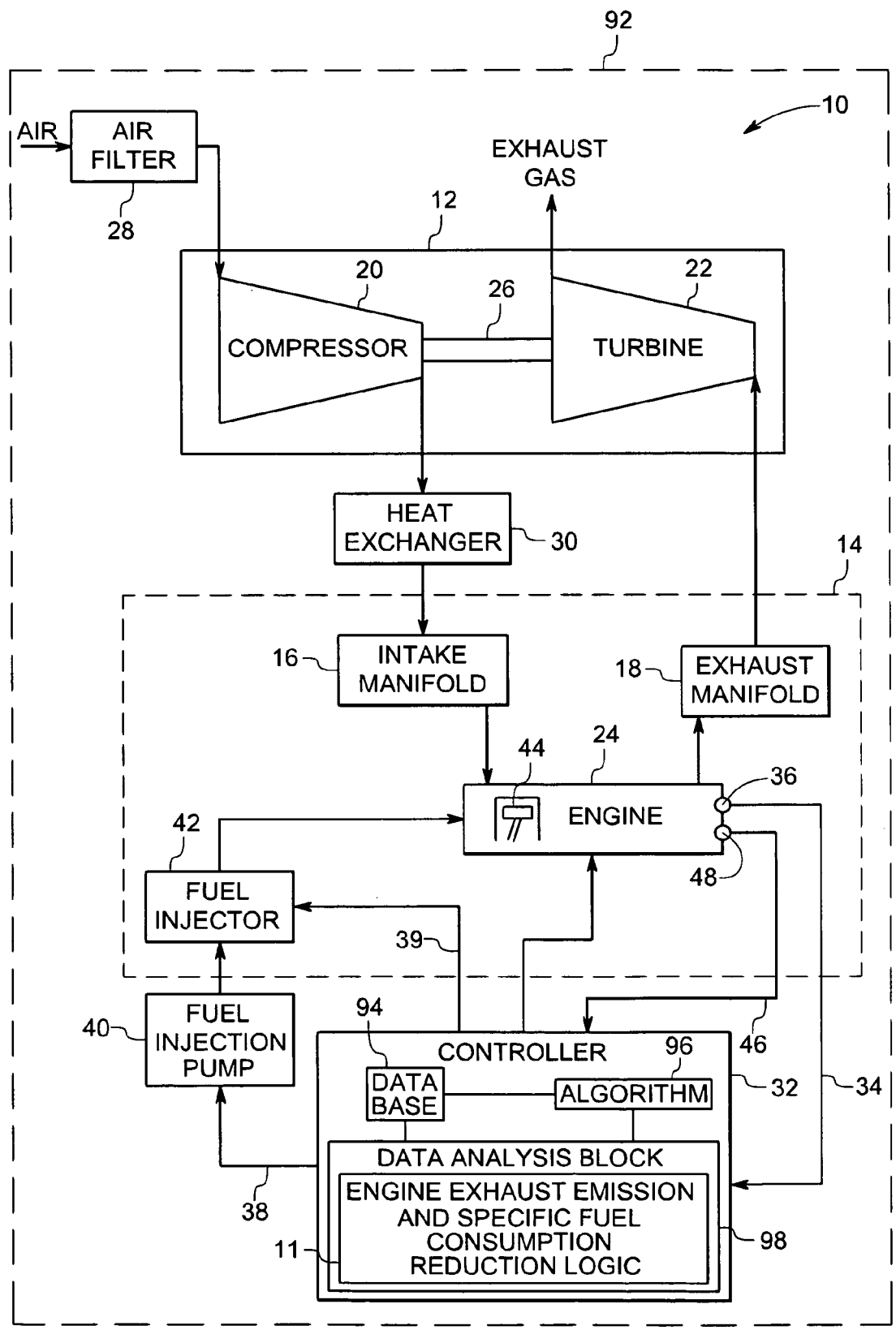
FIG. 4 is a diagrammatical representation of a system incorporating a turbocharged engine, such as a locomotive power unit, having engine exhaust emission and specific fuel consumption control features in accordance with an exemplary embodiment of the present technique.

Referring to FIG. 4, one embodiment of the locomotive power unit 10 is illustrated. As illustrated above, the power unit 10 includes the turbocharger 12 and the diesel engine 14. The power unit 10 may be used for driving a system 92. The system 92 may include high altitude locomotive engine, automobile engine, marine engine, or the like. The power unit 10 includes the controller 32. The controller 32 receives the crank angle signal 34 from the crank angle sensor 36 provided to detect crank angle of the engine 14. The controller 32 may be operable to produce the fuel injection signal 39 to control operation of the plurality of fuel injectors 42. The controller 32 also receives the speed signal 46 from the speed sensor 48 configured to detect speed of the engine 14.

In the illustrated embodiment, the controller 34 may further include a database 94, an algorithm 96, and a data analysis block 98. The database 94 may be configured to store predefined information about the power unit 10. For example, the database 94 may store information relating to crank angle, engine speed, engine power, intake air temperature, exhaust gas temperature, exhaust gas composition, or the like. The database 94 may also include instruction sets, maps, lookup tables, variables, or the like. Such maps, lookup tables, instruction sets, are operative to correlate characteristics of the pilot injection and the main injection to specified engine operation parameters such as engine speed, crank angle, common rail pressure, desired fuel quantity, or the like. Furthermore, the database 94 may be configured to store actual sensed/detected information from the above-mentioned sensors. The algorithm 96 facilitates the processing of signals from the above-mentioned plurality of sensors.

The data analysis block 98 may include a variety of circuitry types, such as a microprocessor, a programmable logic controller, a logic module, etc. The data analysis block 98 in combination with the algorithm 96 may be used to perform the various computational operations relating to determination of fuel injection rate, number of fuel injections, the fuel injection quantity, timing, pressure and pulse duration, time interval between the pilot injection and the main injection, electrical current of the injector waveform, or a combination thereof. Any of the above mentioned parameters may be selectively and/or dynamically adapted or altered relative to time. The controller 34 is configured to control the engine exhaust emission and the specific fuel consumption by performing the pilot injection at the first predetermined time before the piston reaches the top dead center of the compression stroke and by further performing the advanced main fuel injection at the second predetermined time after the first predetermined time before the piston reaches the top dead center of the compression stroke.

Figure 5:
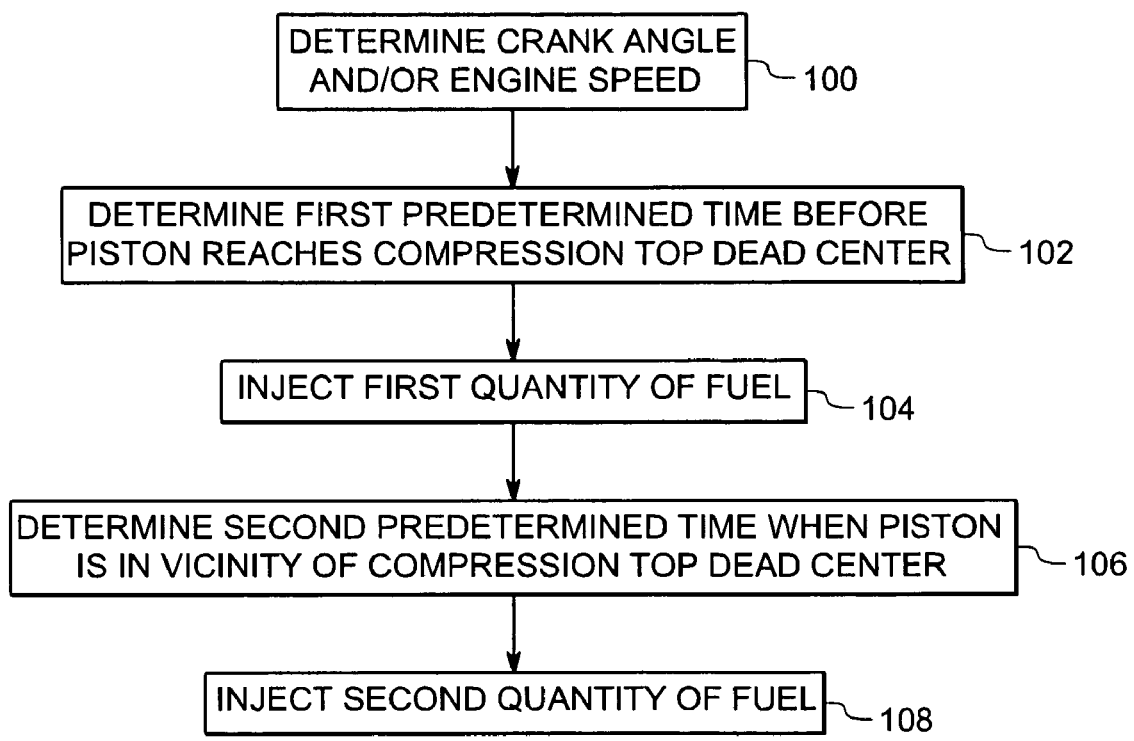
FIG. 5 is a flow chart illustrating a process of controlling engine exhaust emission and specific fuel consumption within a turbocharged engine in accordance with an exemplary embodiment of the present technique.

Referring to FIG. 5, this figure is a flow chart illustrating one embodiment of the method of operating the turbocharged system 10 of FIG. 1. In the illustrated embodiment, the crank angle and the engine speed are determined as represented by step 100. The crank angle sensor 36 is provided to detect the crank angle of the engine and the speed sensor 48 is provided to detect the engine speed (e.g., rotations per minute of the crank shaft). The controller 32 determines the first predetermined time for the pilot fuel injection before the piston reaches the top dead center of the compression stroke based on the crank angle and/or the engine speed as represented by step 102. The controller 32 actuates the fuel injection pump 40 to inject the pilot fuel quantity into the engine cylinder 24 as represented by step 104. In certain embodiments, pilot fuel quantity in the range of 1 to 5% is injected when the piston is 20 to 90 degrees before top dead center of the compression stroke. The pilot fuel atomizes and mixes with the entrained air in the cylinder 24. As the piston moves towards the top dead center, the pressure and temperature of the mixture of pilot fuel and air is increased due to compression. When the mixture of pilot fuel and air reaches an ignition temperature (self ignition temperature), the mixture of pilot fuel and air ignites to form combustion products before and during the main injection event.

The controller 32 determines the second predetermined time for the main fuel injection near the vicinity of the top dead center of the compression stroke based on the crank angle and/or the engine speed as represented by step 106. The controller 32 actuates the fuel injection pump 40 to inject the main fuel quantity into the engine cylinder 24 as represented by step 108. In certain embodiments, main fuel quantity in the range of 95 to 99% is injected when the piston is less than 5 degrees before top dead center of the compression stroke. The main fuel atomizes and mixes with the entrained air in the cylinder 24. The main fuel also mixes with the entrained burnt mixture of pilot fuel and air. The entrained burnt mixture of pilot fuel and air act as diluents with high specific heat to reduce the temperature of the main injection event, thereby reducing exhaust gas emission. The splitting of fuel injection into the pilot fuel injection and the advanced main fuel injection improves the fuel consumption while the maintaining the engine exhaust emission within predetermined limits.

Figure 6:
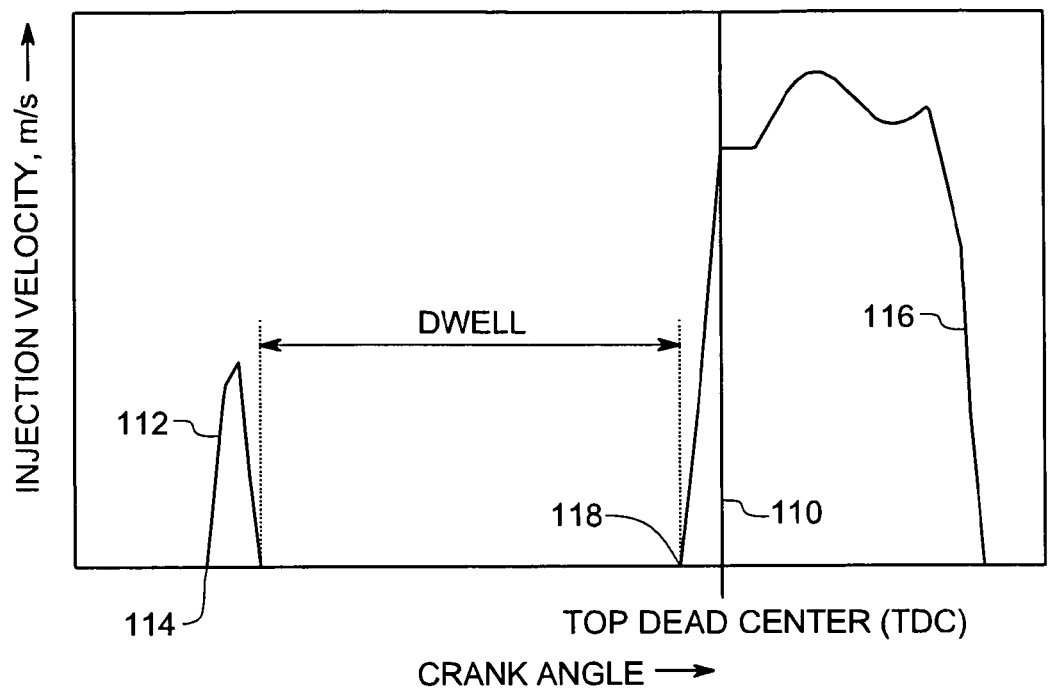
FIG. 6 is a graph illustrating variation of fuel injection velocity for first and second fuel injection quantities relative to crank angle and, specifically, top dead center during a compression stroke of a compression-ignition engine in accordance with an exemplary embodiment of the present technique.

Referring to FIG. 6, a graph representing variation of fuel injection velocity (represented by Y-axis) relative to the crank angle (represented by X-axis) and, specifically, the top dead center 110 during compression stroke of the compression-ignition engine 14 is illustrated in accordance with an exemplary embodiment of the present technique. In the illustrated embodiment, a curve 112 represents pilot fuel injection quantity (e.g. 1%, 3%, and 5%) starting at a first angle 114 prior to top dead center 110 within the engine cylinder 14. The first angle 114 of the pilot fuel injection may be in the range of 20 to 90 degrees before the top dead center 110 during the compression stroke. A curve 116 represents main fuel injection quantity (e.g. 99%, 97%, and 95%) starting at a second angle 118 relative to the top dead center 110. The second angle 118 of the main fuel injection may be in the range of less than 5 degrees before the top dead center 110 during the compression stroke. "Dwell" is the time period between the end of the pilot injection and the start of the main injection. In the illustrated example, dwell may be varied in the range of about 10 to 80 degrees before the top dead center 110.

Figure 7:
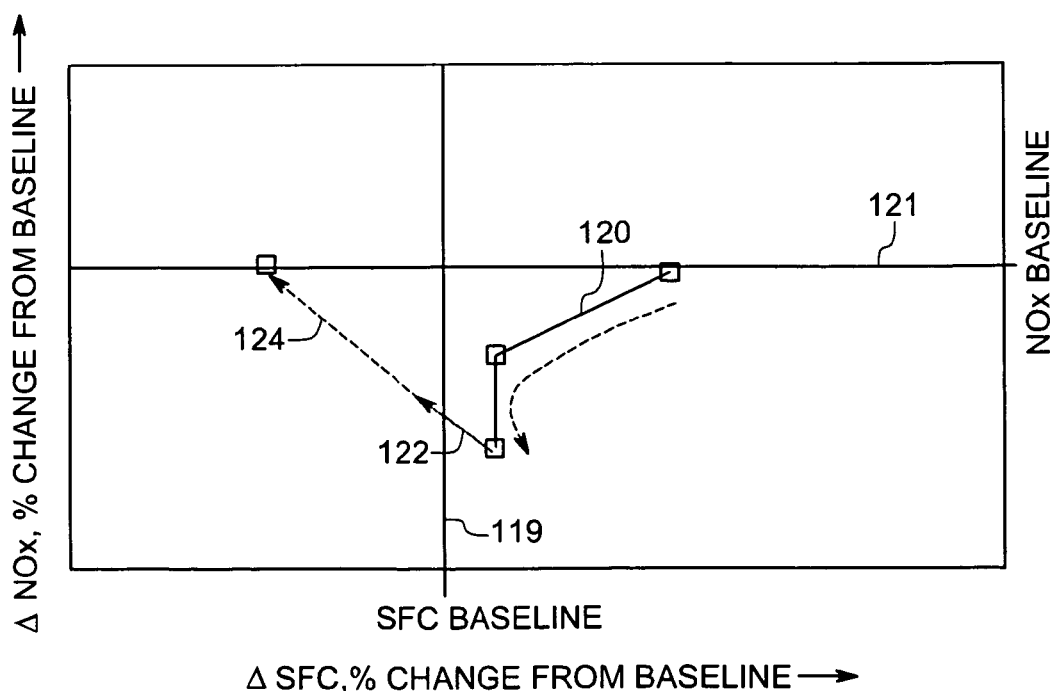
FIG. 7 is a graph illustrating relative variation of NOx emission with respect to specific fuel consumption of a compression-ignition engine in accordance with an exemplary embodiment of the present technique.

Referring to FIG. 7, a graph representing variation of NOx emission (Y-axis) relative to specific fuel consumption (represented by X-axis) of the compression-ignition engine 14 is illustrated in accordance with an exemplary embodiment of the present technique. The X-axis represents percentage change in specific fuel consumption relative to a SFC baseline 119. The Y-axis represents percentage change in NOx emission relative to a NOx base line 121. A Curve 120 represents decrease in NOx emission and specific fuel consumption for 3% of pilot fuel injection. The dwell between the pilot injection and the main injection may be varied in the range of 10 to 80 degrees before top dead center. A Curve 122 represents decrease in specific fuel consumption and increase in NOx emission for 3% of pilot fuel injection, dwell of 60 degrees before top dead center, and relatively higher fuel injection rate. A Curve 124 represents reduction in specific fuel consumption and increase in NOx emission for 3% pilot fuel injection, dwell of 60 degrees before top dead center, relatively higher fuel injection rate, and the main fuel injection timing advanced by 2 degrees before the top dead center. As discussed above, the engine exhaust emissions are controlled and the specific fuel consumption is reduced by splitting fuel injection of a predetermined quantity into a pilot fuel injection and an advanced main fuel injection before top dead center position of a compression stroke of the engine 14 based on operating conditions of the engine 14 such as engine speed, crank angle, common rail pressure, or the like. In one example, more than 2% of specific fuel consumption benefit may be obtained while maintaining the NOx emission within predetermined limits.

Referring to FIG. 8, this figure is a flow chart illustrating another embodiment of the method of operating the turbocharged system 10 of FIG. 1. In the illustrated embodiment, the fuel injection system of the engine 14 is actuated based on the crank angle and the engine speed as represented by step 126. The fuel injection system includes the plurality of fuel injectors coupled to the high pressure common rail 82 configured to pressurize the fuel to the preselected pressure. As discussed above, the usage of the high pressure common rail 82 along with electrically actuated fuel injector enables the controller 32 to provide flexibility in fuel injection rate, number of fuel injections, the fuel injection quantity, timing, pressure and pulse duration.

The engine exhaust emissions are reduced or maintained within predetermined limits by splitting the fuel injection into the pilot fuel injection and the main fuel injection before top dead center position of the compression stroke of the engine 14 as represented by step 128. The pilot fuel quantity in the range of 1 to 5% is injected when the piston is 20 to 90 degrees before top dead center of the compression stroke. The pilot fuel atomizes and mixes with the entrained air in the cylinder 24. As the piston moves towards the top dead center, the pressure and temperature of the mixture of pilot fuel and air is increased due to compression. When the mixture of pilot fuel and air reaches the ignition temperature, the mixture of pilot fuel and air ignites to form combustion products before and during the main injection event. The specific fuel consumption is reduced by advancing the main fuel injection in the vicinity of the top dead center of the compression stroke as represented by step 130. The main fuel atomizes and mixes with the entrained air in the cylinder 24. The main fuel also mixes with the entrained burnt mixture of pilot fuel and air. The entrained burnt mixture of pilot fuel and air act as diluents with high specific heat to reduce the temperature of the main injection event, thereby reducing exhaust gas emission. The advancing of the main injection event enables better atomization of the fuel resulting in improved fuel consumption. Hence a combination of smaller quantity of pilot fuel injection and advanced main fuel injection provides reduced fuel consumption while maintaining the exhaust emissions within safe limits.

Referring to FIG. 9, this figure is a flow chart illustrating a method of manufacturing the power unit 10 in accordance with embodiments of the present technique. The method includes providing the split fuel injection quantity and proportion control logic 62 that enables the controller 32 to inject the first quantity of fuel (e.g., pilot fuel injection) 64 into the engine cylinder before the piston reaches top dead center position of the compression stroke and to inject the second quantity of fuel (e.g., majority/main fuel injection) 66 into the engine cylinder when the piston is in the vicinity of the top dead center position of the compression stroke as represented by step 132. The pilot fuel injection is performed when the piston position is in the range of 20 to 90 degrees before the top dead center of the compression stroke. The method further includes providing the split fuel injection timing/advance control logic 68 that enables the controller 32 to inject the main fuel injection quantity into the engine cylinder at the second predetermined time 72 before the piston reaches top dead center position of a compression stroke as represented by step 134. The main fuel injection is advanced to less than or equal to 5 degrees before the top dead center of the compression stroke. The method further includes providing the split fuel injection pressure and pulse duration control logic 74 that enables the controller 32 to control the pressure and pulse duration of the pilot fuel injection 76 and the main fuel injection 78 as represented by step 136. The split fuel injection pressure and pulse duration control logic 74 may also enable the controller 32 to control dwell between the pilot and the main injection events.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method, comprising:
   injecting a first quantity of fuel into an engine cylinder at a first predetermined time during a second half of a compression stroke before a piston of the engine cylinder reaches top dead center of the compression stroke, wherein injecting the first quantity of fuel comprises injecting a pilot fuel quantity of about 1 to 5 percent of a fuel quantity; and
   injecting a second quantity of fuel into the engine cylinder at a second predetermined time after the first predetermined time when the piston is advanced by a predetermined advance value before the piston reaches the top dead center of the compression stroke, wherein injecting the second quantity of fuel comprises injecting a majority fuel quantity of about 95 to 99 percent of the fuel quantity.

2. The method of claim 1, further comprising entraining combustion products from combustion of the first quantity of fuel into the second quantity of fuel.

3. The method of claim 1, wherein the first predetermined time corresponds with a crank angle of about 20 to 90 degrees before top dead center of the compression stroke, and the second predetermined time corresponds with a crank angle less than about 5 degrees before top dead center of the compression stroke.

4. The method of claim 1, further comprising fueling a diesel engine comprising the engine cylinder.

5. The method of claim 4, further comprising powering a locomotive comprising the diesel engine.

6. The method of claim 5, further comprising modifying a fuel injection system of the diesel engine to reduce specific fuel consumption without increasing emission level.

7. The method of claim 6, wherein modifying the fuel injection system comprises providing a high pressure common rail having a plurality of fuel injectors.

8. The method of claim 1, wherein injecting the first and second quantity of fuel comprises reducing specific fuel consumption without increasing a pollutant emissions level of nitrogen oxides.

9. The method of claim 1, comprising modifying a fuel injection scheme of an emissions compliant engine to reduce specific fuel consumption without increasing a pollutant emissions level.

10. A method, comprising:
    advancing fuel injection by a predetermined advance value to reduce specific fuel consumption in a compression-ignition engine of a locomotive; and
    splitting the fuel injection of a predetermined quantity of fuel into a pilot fuel quantity and a majority fuel quantity during a second half of a compression stroke and before top dead center of the compression stroke of the compression-ignition engine to reduce nitrogen oxide emissions associated with advancing the fuel injection;
    wherein advancing and splitting comprises modifying a fuel injection system of the compression-ignition engine to reduce the specific fuel consumption without increasing a pollutant emissions level.

11. The method of claim 10, wherein advancing fuel injection comprises injecting the pilot fuel quantity at a crank angle of about 20 to 90 degrees before top dead center of the compression stroke and injecting the majority fuel quantity at a crank angle less than about 5 degrees before top dead center of the compression stroke.

12. The method of claim 10, wherein modifying the fuel injection system comprises providing a high pressure common rail having a plurality of fuel injectors.

13. The method of claim 10, wherein splitting comprises providing about 1 to 5 percent of the predetermined quantity of fuel as the pilot fuel quantity, and providing about 95 to 99 percent of the predetermined quantity of fuel as the majority fuel quantity.

14. The method of claim 10, wherein modifying the fuel injection system comprises modifying fuel injection of an emissions compliant configuration of the compression-ignition engine to reduce the specific fuel consumption without increasing the pollutant emissions level of at least nitrogen oxides.

15. A system, comprising:
a controller configured to inject a first quantity of fuel into an engine cylinder at a first predetermined time during a second half of a compression stroke before a piston of the engine cylinder reaches top dead center of the compression stroke, and configured to inject a second quantity of fuel into the engine cylinder at a second predetermined time after the first predetermined time when the piston is advanced by a predetermined advance value before the piston reaches the top dead center of the compression stroke;
wherein the controller is configured to inject the first quantity of fuel at the first predetermined time and the second quantity of fuel at the second predetermined time into the engine cylinder to reduce specific fuel consumption without increasing a pollutant emissions level.

16. The system of claim 15, further comprising a crank angle sensor and an engine speed sensor coupled to the controller and configured to detect crank angle and engine speed, respectively.

17. The system of claim 16, wherein the controller is configured to control injection of the first quantity of fuel and the second quantity of fuel into the engine cylinder based on the respective values of the crank angle and the engine speed.

18. The system of claim 17, further comprising a diesel engine having the controller.

19. The system of claim 18, further comprising a vehicle having the diesel engine and the controller coupled to the diesel engine.

20. The system of claim 18, wherein the diesel engine include a plurality of specifications comprising a maximum in-cylinder pressure in the range of 80 to 240 bars, four stroke, stepped operation, speed in the range of 300 to 1500 revolutions per minute, displacement in the range of 5 to 20 liters per cylinder, and a common rail fuel injection system.

21. The system of claim 15, wherein the controller is configured to control a plurality of fuel injectors to adjust quantity and timing of fuel injection based on crank angle and engine speed.

22. The system of claim 15, wherein the controller is configured to inject about 1 to 5 percent of a fuel quantity as the first quantity of fuel, and about 95 to 99 percent of the fuel quantity as the second quantity of fuel.

23. The system of claim 15, wherein the controller is configured to modify fuel injection of an emissions compliant engine to inject the first and second quantities of fuel at the first and second predetermined times, respectively, to reduce the specific fuel consumption without increasing the pollutant emissions level of at least nitrogen oxides.

24. A locomotive, comprising:
a turbocharger;
a compression-ignition engine include a plurality of specifications comprising a maximum in-cylinder pressure in the range of 80 to 240 bars, four stroke, stepped operation, speed in the range of 300 to 1500 revolutions per minute, displacement in the range of 5 to 20 liters per cylinder, and a common rail fuel injection system; and
a controller coupled to the compression-ignition engine and configured to inject a first quantity of fuel into an engine cylinder at a first predetermined time during a second half of a compression stroke before a piston of the engine cylinder reaches top dead center of the compression stroke, and configured to inject a second quantity of fuel into the engine cylinder at a second predetermined time after the first predetermined time when the piston is advanced by a predetermined advance value before the piston reaches the top dead center of the compression stroke.

25. The locomotive of claim 24, further comprising a crank angle sensor and an engine speed sensor coupled to the controller and configured to detect crank angle and engine speed, respectively.

26. The locomotive of claim 25, wherein the controller is configured to control injection of the first quantity of fuel and the second quantity of fuel into the engine cylinder based on the respective values of the crank angle and the engine speed.

27. The locomotive of claim 24, wherein the controller is configured to inject about 1 to 5 percent of a fuel quantity as the first quantity of fuel, and about 95 to 99 percent of the fuel quantity as the second quantity of fuel.

28. The locomotive of claim 24, wherein the controller is configured to modify fuel injection of an emissions compliant configuration of the compression-ignition engine to inject the first and second quantities of fuel at the first and second predetermined times, respectively, to reduce specific fuel consumption without increasing a pollutant emissions level.

29. A method, comprising:
providing a controller configured to inject a first quantity of fuel into an engine cylinder at a first predetermined time during a second half of a compression stroke before a piston of the engine cylinder reaches top dead center of the compression stroke, and configured to inject a second quantity of fuel into the engine cylinder at a second predetermined time after the first predetermined time when the piston is advanced by a predetermined advance value before the piston reaches the top dead center of the compression stroke;
wherein the controller is configured to inject the first quantity of fuel at the first predetermined time and the second quantity of fuel at the second predetermined time into the engine cylinder to reduce specific fuel consumption without increasing a pollutant emissions level.

30. The method of claim 29, further comprising providing a compression-ignition engine having the controller.

31. The method of claim 30, further comprising providing a vehicle having the compression-ignition engine and the controller coupled to the compression-ignition engine.

32. The method of claim 31, wherein providing the vehicle comprises providing a locomotive.

33. The method of claim 29, wherein the controller is configured to inject about 1 to 5 percent of a fuel quantity as the first quantity of fuel, and about 95 to 99 percent of the fuel quantity as the second quantity of fuel.

34. A tangible medium having a computer program, comprising:

programming instructions disposed on the tangible medium, wherein the programming instructions include instructions to inject a first quantity of fuel into an engine cylinder at a first predetermined time during a second half of a compression stroke before a piston of the engine cylinder reaches top dead center of the compression stroke, and instructions to inject a second quantity of fuel into the engine cylinder at a second predetermined time after the first predetermined time when the piston is advanced by a predetermined advance value before the piston reaches the top dead center of the compression stroke;

wherein the programming instructions are configured to inject the first quantity of fuel at the first predetermined time and the second quantity of fuel at the second predetermined time into the engine cylinder to reduce specific fuel consumption without increasing a pollutant emissions level.

35. The tangible medium of claim 34, wherein the instructions to inject the first quantity of fuel comprise instructions to inject a pilot fuel quantity of about 1 to 5 percent of a fuel quantity, and instructions to inject the second quantity of fuel comprise instructions to inject a majority fuel quantity of about 95 to 99 percent of the fuel quantity.

* * * * *